(12) United States Patent
Brower

(10) Patent No.: US 10,548,187 B2
(45) Date of Patent: Jan. 28, 2020

(54) LOW-DROPOUT CURRENT REGULATOR FOR LIGHT HEAD

(71) Applicant: Code 3, Inc., St. Louis, MO (US)

(72) Inventor: Richard Nelson Brower, St. Louis, MO (US)

(73) Assignee: Code 3, Inc., St. Louis, MO (US)

( * ) Notice: Subject to any disclaimer, the term of this patent is extended or adjusted under 35 U.S.C. 154(b) by 238 days.

(21) Appl. No.: 15/736,463

(22) PCT Filed: Jun. 14, 2017

(86) PCT No.: PCT/US2017/037535
§ 371 (c)(1),
(2) Date: Dec. 14, 2017

(87) PCT Pub. No.: WO2018/231230
PCT Pub. Date: Dec. 20, 2018

(65) Prior Publication Data
US 2019/0364625 A1 Nov. 28, 2019

(51) Int. Cl.
*H05B 33/08* (2006.01)
*B60Q 1/52* (2006.01)
*B60Q 1/46* (2006.01)
*G05F 1/575* (2006.01)
*G05F 1/577* (2006.01)

(52) U.S. Cl.
CPC .......... *H05B 33/0812* (2013.01); *B60Q 1/46* (2013.01); *B60Q 1/52* (2013.01); *G05F 1/575* (2013.01);
(Continued)

(58) Field of Classification Search
CPC .......... H05B 33/0815; H05B 33/0824; H05B 33/0851; H05B 33/0845; H05B 33/083;
(Continued)

(56) References Cited

U.S. PATENT DOCUMENTS 7,843,148 B2 * 11/2010 Gater .................... G09G 3/342
  315/291
8,674,913 B2 * 3/2014 Knapp .............. H04L 12/40013
  345/82

(Continued)

OTHER PUBLICATIONS

Cupid Controls "Your CuPID as a PLC: Modbus Client LED Op Amp Monitoring", archived at https://web.archive.org/web/20141024114603/http://www.cupidcontrols.com/2014/08/your-cupid-as-a-plc-modbus-client-led-op-amp-monitoring/, archived Oct. 24, 2014, Wayback Machine, 6 pages.

*Primary Examiner* — Vibol Tan
(74) *Attorney, Agent, or Firm* — Stoel Rives LLP; Robert R. Teel

(57) ABSTRACT

In connection with a ground transportation vehicle light head (86) powered by a battery-based voltage source (20) supplying positive (76) and reference (i.e., ground) (78) voltages that define a voltage difference (22) applied across a number of multiple series-connected high-power light-emitting diodes (HP LEDs) (12) and current regulator circuitry (80) electrically connected to them, ultra-low dropout circuit techniques are disclosed for increasing a portion of the voltage difference available from the battery-based voltage source to forward bias and thereby maximize the number of the multiple series-connected HP LEDs emitting light by maintaining a low voltage drop (82) across the current regulator circuitry. By maintaining the low voltage drop and making available from the battery-based voltage source an increased portion of the voltage difference, at least one additional HP LED is capable of being forward biased to thereby maximize the number of multiple series-connected HP LEDs emitting light from the light head.

21 Claims, 2 Drawing Sheets

(52) U.S. Cl.
CPC ......... *G05F 1/577* (2013.01); *H05B 33/0824* (2013.01); *H05B 33/0851* (2013.01); *B60Q 2400/00* (2013.01); *B60Q 2400/20* (2013.01)

(58) Field of Classification Search
CPC .............. H05B 33/089; H05B 33/0827; H05B 33/0812; H05B 33/0803; H05B 33/0848; H05B 33/0842; H05B 33/0884; H05B 33/0821; H05B 33/0809; H05B 33/0887; H05B 33/0896; H05B 37/02; H05B 41/2828; Y02B 20/347; Y02B 20/343; Y02B 20/345; F21V 23/003; H02J 7/008; B60Q 1/52; B60Q 2400/00; B60Q 2400/20; B60Q 1/46; G05F 1/575; G05F 1/577

See application file for complete search history.

(56) References Cited

U.S. PATENT DOCUMENTS

| | | | |
|---|---|---|---|
| 8,928,244 B2 * | 1/2015 | Kikuchi | H05B 33/0851 |
| | | | 315/291 |
| 9,454,500 B2 * | 9/2016 | Evers | G06F 13/362 |
| 9,531,157 B2 * | 12/2016 | Ichikawa | H05B 33/0815 |
| 9,578,701 B1 * | 2/2017 | Logiudice | H05B 33/0815 |
| 9,621,024 B2 * | 4/2017 | Endo | H02H 9/08 |
| 9,648,679 B2 * | 5/2017 | Murakami | H05B 33/0815 |
| 10,299,330 B1 * | 5/2019 | Huang | H05B 33/0842 |
| 10,416,744 B2 * | 9/2019 | Kimura | G06F 1/28 |
| 10,420,196 B2 * | 9/2019 | Ichikawa | B60Q 1/0088 |
| 2005/0057179 A1 | 3/2005 | Madhani et al. | |
| 2009/0187925 A1 | 7/2009 | Hu et al. | |
| 2010/0085108 A1 | 4/2010 | Lundberg | |

* cited by examiner

LOW-DROPOUT CURRENT REGULATOR FOR LIGHT HEAD

RELATED APPLICATION

This application is a National Stage of International Application No. PCT/US2017/37535, filed Jun. 14, 2017, which is hereby incorporated by reference.

TECHNICAL FIELD

This disclosure generally relates to light heads (also called light modules or light engines) such as a Society of Automotive Engineers (SAE) class-one type of directional flashing optical warning device for authorized emergency, maintenance, and service vehicles. In particular, this disclosure relates to low-dropout (LDO) regulator circuitry for regulating current through multiple series-connected light-emitting diodes (LEDs) in a light head.

BACKGROUND INFORMATION

Illumination of high-power LEDs (HP LEDs) is typically accomplished by means of a constant current source for at least two reasons. First, light produced by an LED is directly related to current flowing through it, i.e., the number of electrons reaching an LED's junction is proportional to the number recombining to produce light. Second, LEDs have exponentially related forward current and voltage (I-V) characteristics in which small changes of forward voltage produce large variations in current. Thus, controlling for voltage is more challenging than regulating current, particularly as the I-V characteristics vary in response to heat generated by the LED.

Voltage regulators are readily configurable to produce a constant current suitable for powering LEDs. Two types of voltages regulators include switch-mode and linear types of regulators. Switch-mode voltage regulators rapidly switch a transistor to control energy in inductive elements based on the duty cycle of the switching. Switch-mode circuits are fairly efficient but they are more complex than linear type voltage regulators to implement and cause undesirable ripple current effects due to rapid switching. Linear voltage regulators, including so-called LDO types of linear voltage regulators, vary resistance of a regulation device, e.g., a pass transistor, in accordance with a load to produce a constant output voltage. The regulation device, therefore, is made to act like a variable resistor—continuously adjusting a voltage divider network to maintain a constant output voltage and continually dissipating the difference between the input and regulated voltages as waste heat. Because these voltage regulators tightly regulate the voltage drop between an output node and a reference voltage node (e.g., ground), a fixed resistor connected between these two nodes yields a source of constant current. This remains true for both high-side and low-side current source configurations.

All linear voltage regulators expect an input voltage at least some minimum amount higher than the desired output voltage. That minimum amount, called the dropout voltage, is the input-to-output differential voltage at which a circuit ceases to regulate against further reductions in input voltage. This point typically occurs when the input voltage approaches the output voltage. For example, if the dropout voltage of a regulator is 1 V and the desired operating output voltage of the regulator is 5 V, then the input voltage should be maintained at 6 V or higher. If the input voltage drops below this value, then the output voltage will fail to reach 5 V. Dropout voltages vary depending on the load on the regulator—usually increasing under higher load—due to the internal resistance of the pass transistor and associated circuitry.

LDO voltage regulators, as the name implies, are a specific class of direct current (DC) linear regulator capable of regulating output voltage even when the supply voltage is somewhat close in value to the output voltage. LDO voltage regulators are characterized by a pass transistor maintained in a region of operation—i.e., saturation and linear/triode regions for, respectively, for BJTs and MOSFETs. In this region, the transistor behaves as a low-value resistance, thereby creating a dropout voltage. Additional voltage is lost by circuitry used to configure the LDO voltage regulator as a source of constant current.

SUMMARY OF THE DISCLOSURE

Disclosed are linear current regulation techniques providing an ultra-low dropout voltage of tens of millivolts (mV). The ultra-low dropout voltage establishes a negligible voltage drop when a voltage difference supplied across multiple series-connected HP LEDs does not significantly exceed minimum forward voltages of the number of HP LEDs. Furthermore, when the voltage difference supplied to the multiple HP LEDs rises, then the linear current regulation techniques provide a variable voltage drop by which to dissipate excess voltage. For example, a vehicle battery nominally supplies 12 V for forward biasing four HP LEDs with little voltage headroom left available for current regulator circuitry. Conversely, an alternator of the vehicle supplies 13.8 V so about 1.8 V is dropped across current regulator circuitry.

For a vehicle light head powered by a battery-based voltage system supplying upper and lower voltages that define a voltage difference applied across a series-connected set of high-power light-emitting diodes (HP LEDs) and current regulator circuitry electrically connected to, and facilitating light emission from, the HP LEDs of the series-connected set, disclosed are circuitry and associated methods of maximizing a number of HP LEDs in the series-connected set that are capable of emitting light. One embodiment includes providing low-dropout (LDO) current regulator circuitry of which the current regulator circuitry, voltage reference circuitry, and feedback drive circuitry are parts; the current regulator circuitry including a passive sense component and a pass transistor, the pass transistor includes a first terminal coupled to receive current supplied by the battery-based voltage system, a second terminal coupled to deliver the current to the passive sense component providing a feedback voltage representing the current that passes through the series-connected set, and a control terminal by which an amount of the current is controllable; the voltage reference circuitry providing a reference voltage; the feedback drive circuitry having first and second input terminals to detect a difference between the reference and feedback voltages applied to, respectively, the first and second input terminals, and an output terminal to generate a control signal upon amplification of the difference; and the control signal having a magnitude that rapidly adjusts between the upper and lower voltages for application to the control terminal of the pass transistor that, in response to the magnitude of the control signal, regulates the amount of the current that flows through the series-connected set while maintaining, as the voltage difference approaches a sum of minimum forward voltages of the HP LEDs, a negligible voltage drop across the current regulator circuitry such that substantially all of the voltage difference remains available for forward biasing the HP LEDs.

Additional aspects and advantages will be apparent from the following detailed description of embodiments, which proceeds with reference to the accompanying drawings.

DETAILED DESCRIPTION OF EMBODIMENTS

To avoid complicated and costly switch-mode regulator circuits in LED light heads, linear regulated supplies have been preferred. In general, when employing a linear voltage regulator to control current through a series-connected set of HP LEDs, the sum of the voltage drops across the individual HP LEDs is specified such that the sum does not exceed a portion of the voltage difference remaining after some voltage is dropped across current regulator circuitry (i.e., series-connected components that do not contribute to light output of the light head). Accordingly, to realize cost savings and simplicity of linear voltage regulators while increasing light output, a challenge is to minimize voltage dropped across current regulator circuitry so as to maximize the number of HP LEDs in a series-connected set.

Figure 1:
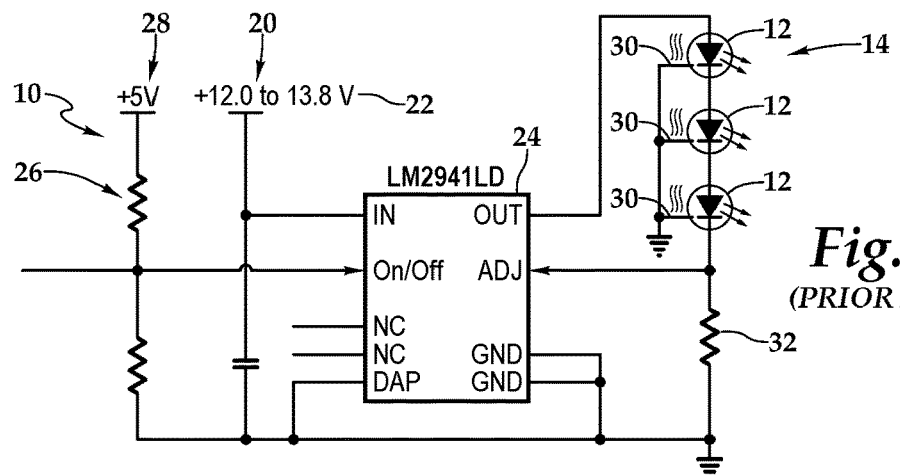
FIG. 1 is an electrical circuit schematic diagram of prior art LDO circuitry configured to regulate current through three HP LEDs.

FIG. 1 shows a previous attempt at linear current regulator circuitry 10 for powering HP LEDs 12 forming a series-connected set 14 on a PCB 16 (FIG. 2) of a light head (not shown). In this attempt, a nominal 12.0-13.8 V vehicle battery-based voltage system 20, such as a 12-volt starting-lighting-ignition (SLI) battery or a nominal 13.8 V alternator, provides positive and reference voltages that define a voltage difference 22 applied across a commercial, off the shelf LDO integrated circuit (IC) 24 available as part number LM2941LD from Texas Instruments Inc. of Dallas, Texas. LDO IC 24 is powered by way of a resistive voltage divider 26 of a fixed 5.0 V voltage source 28. LDO IC 24 is also placed in electrical series with three HP LEDs 12, such as XLamp® XQ-E LEDs available from Cree, Inc. of Durham, N.C. These LEDs have a maximum power output of three watts (W), a maximum drive current of 1 A, and a maximum junction temperature of 150° C. (hence FIG. 1 shows heat sink 30). These LEDs also have a typical forward voltage of 3.2 V at 600 milliamps (mA), but they operate at lower voltages as well. In other words, although the nominal forward voltage in this example is 3.2 V, HP LEDs 12 emit light at lower voltages, e.g., 3.0 V each, in which case current is about 10-20% less than nominal. This difference is fairly imperceptible to the end user.

Notwithstanding its "low" dropout moniker, LDO IC 24 presents a relatively large voltage drop with respect to voltage difference 22 of circuitry 10. For example, LDO IC 24 has a dropout of about 0.5 V at 1 amp (A). A sense resistor 32 typically drops another 0.5 V for a total of 1 V dropped across the current regulator circuitry, i.e., about 8.33% of 12 V. The sum of all the drops in series with three HP LEDs 12, therefore, equals about 10.6 V (3*3.2 V+1 V). That leaves 1.4 V (12.0–10.6 V) remaining. The portion remaining, however, is less than a minimum forward voltage of an additional HP LED. Thus, there is insufficient head room available by which to add a fourth HP LED in series-connected set 14 while still achieving a relatively consistent light output throughout the full 12.0-13.8 V input voltage range. This design, therefore, allows for a maximum of three HP LEDs per string and thereby wastes any remaining voltage as power dissipated across LDO IC 24 and any other additional series-connected components. As an aside, note that the term string refers to the electrical arrangement, not necessarily spatial alignment, of HP LEDs 12. For example, a string of four HP LEDs 12 may be arranged within quadrants defining a square-shaped perimeter.

Figure 2:
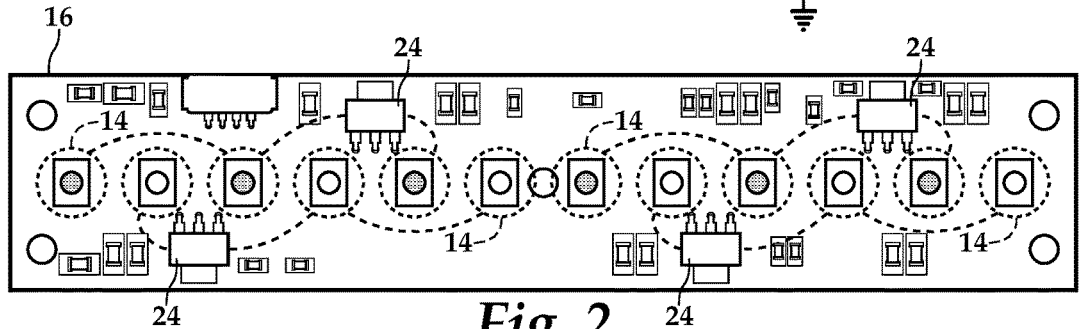
FIG. 2 is a front elevation view of a prior art printed circuit board (PCB) of a light head, in which the PCB is populated with four of the prior art LDO circuits of FIG. 1 that were previously necessary for forward biasing four strings (annotated by dashed lines) of three HP LEDs in each string.

Because the prior art technology accommodates just three HP LEDs, it also resulted in numerous LDO ICs being employed in a light head having multiple strings of HP LEDs. For example, FIG. 2 shows how four LDO ICs 24 are employed to regulate currents through four corresponding strings 14 of three HP LEDs in each string. Each string 14 draws its own current that, when multiplied across all strings in all of the light heads forming a light bar (see e.g., side-by-side PCBs 50 of FIG. 5 arranged to form a light bar), collectively result in relatively high power consumption.

Figure 5:
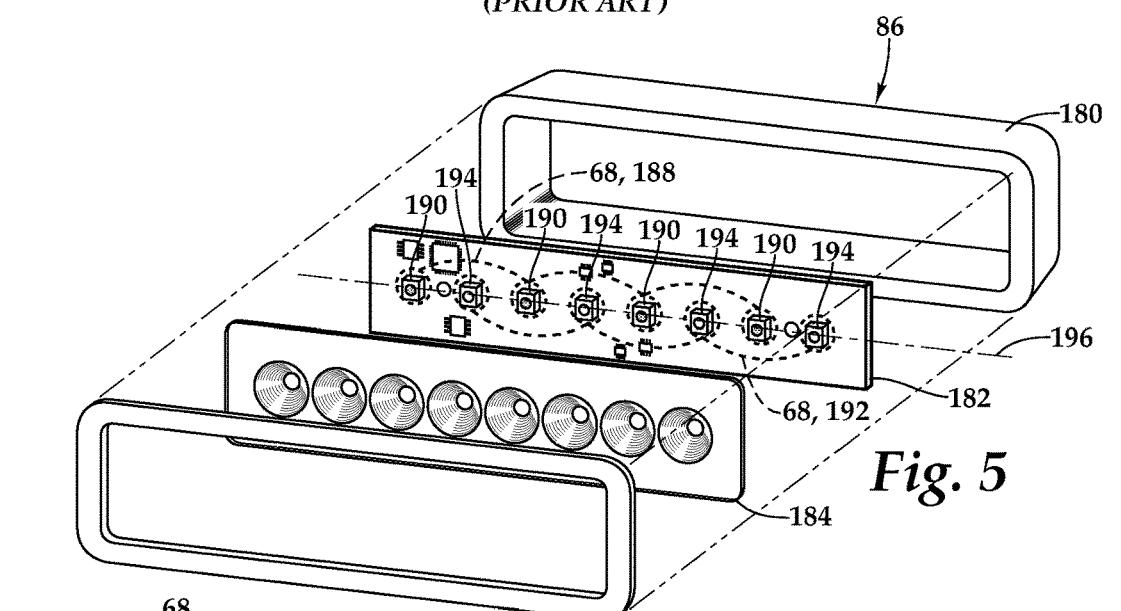
FIG. 5 is an exploded isometric view of a light head including a PCB populated with two of the LDO circuits of FIG. 3 or 4 for forward biasing two strings (annotated by dashed lines) of four HP LEDs in each string.
Figure 3:
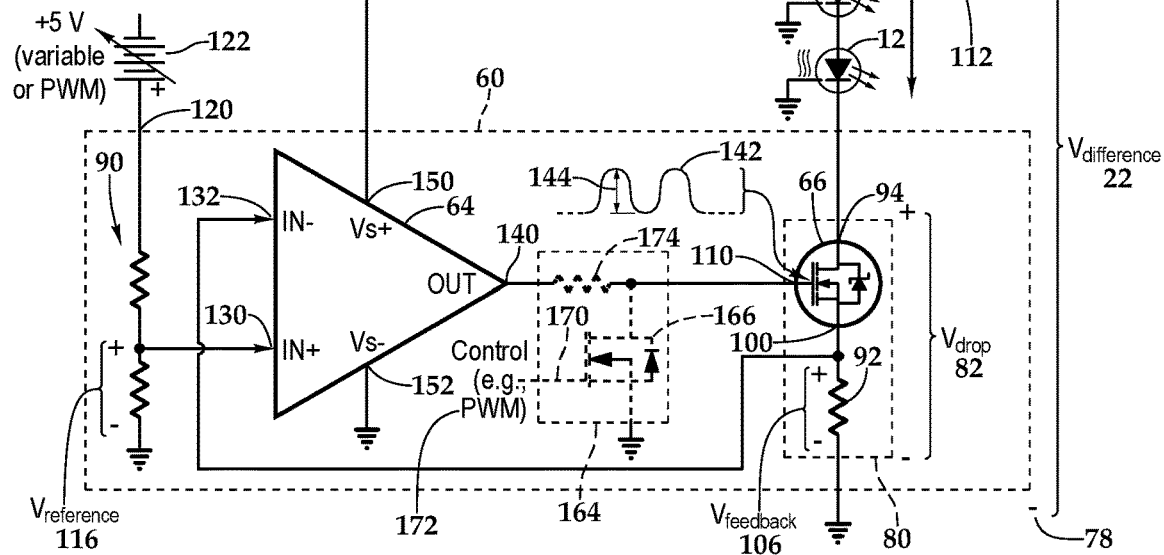
FIGS. 3 and 4 are electrical circuit schematic diagrams of LDO current regulator circuits suitable for powering four HP LEDs in a single string, according to first and second embodiments.
Figure 4:
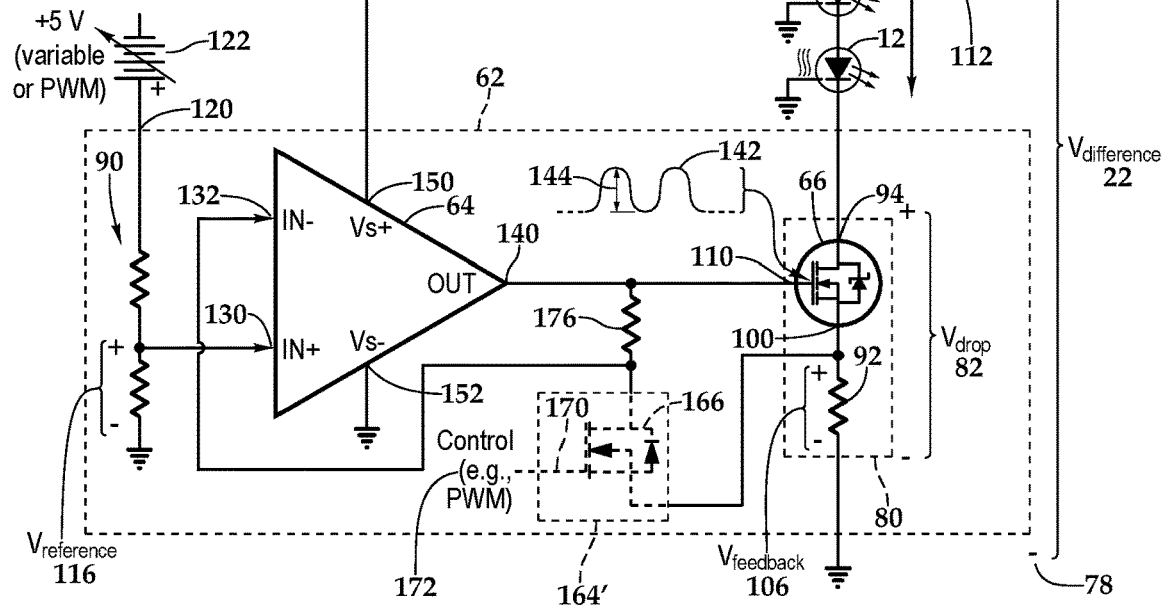

In contrast, FIGS. 3 and 4 show, respectively, a first LDO current regulator circuitry embodiment 60 and a second LDO current regulator circuitry embodiment 62 that employ discrete feedback drive circuitry (e.g., a differential amplifier, which may include an operational amplifier, opamp 64) and a pass transistor 66 (common parts share common reference numbers), arranged to maximize the number of HP LEDs 12 in a series-connected set 68. These two embodiments 60 and 62 are suitable for regulating current 70 of about 1 A while maintaining an ultra-low dropout observed to be as low as 100 mV when an upper voltage 76 and a lower voltage 78 (e.g., ground) define voltage difference 22 (e.g., 12 V) applied across series-connected set 68 and current regulator circuitry 80. The ultra-low dropout facilitates a negligible voltage drop 82 that is about one order of magnitude less than the aforementioned typical 1-V minimum available in linear current regulator circuitry 10 of FIG. 1. Because of negligible voltage drop 82, embodiments 60 and 62 are actually capable of driving at least four HP LEDs 12 in series-connected set 68. In other words, when operating on 12-V battery power such that voltage difference 22 approaches a sum of minimum forward voltages of HP LEDs 12, negligible voltage drop 82 ensures substantially all of voltage difference 22 remains available for forward biasing a maximum number (e.g., at least four) of HP LEDs 12 so that they are each capable of emitting light. Accordingly, both embodiments 60 and 62 are suitable for a vehicle light head 86 (FIG. 5). For purpose of conciseness, the following paragraphs describe first LDO current regulator circuitry embodiment 60 followed by a brief description contrasting it with second LDO current regulator circuitry embodiment 62.

With reference to FIG. 3, first LDO current regulator circuitry 60 includes current regulator circuitry 80, voltage reference circuitry 90, and opamp 64. These components are described in the following three paragraphs.

Current regulator circuitry 80 includes a passive sense component 92 (e.g., a resistor) and pass transistor 66. Pass transistor 66 includes a first terminal 94 coupled to receive current 70 supplied by battery-based voltage system 20; a second terminal 100 coupled to deliver current 70 to passive sense component 92 that establishes a feedback voltage 106 representing current 70 passing through series-connected set 68; and a control terminal 110 (e.g., FET gate) by which an amount 112 of current 70 is controllable. The word terminal encompasses any electrically conducting material, including pins, wires, PCB metal, or other material.

Voltage reference circuitry 90 provides a reference voltage 116 for opamp 64. In some embodiments, voltage reference circuitry 90 is a resistive voltage divider. Thus, reference voltage 116 is readily controllable by varying voltage applied at an input 120 of voltage reference circuitry 90. Voltage applied at input 120, and per force presented to opamp 64 by way of reference voltage 116, also controls amount 112 of current 70. According to some embodiments, a variable voltage 122 is provided at input 120 by a digital or analog voltage source, in which case an adjustment of variable voltage 122 may be achieved either through pulse width modulation (PWM) or a variable analog output from a microcontroller. Furthermore, in some embodiments, multiple LDO circuits collectively receive such variable voltage 122 so that a single voltage source controls all of the associated strings of HP LEDs that are dimmable in response to a PWM duty cycle or voltage level varied at input 120.

Opamp 64 includes a first input terminal 130 and a second input terminal 132. First input terminal 130 is a non-inverting input terminal and second input terminal 132 is an inverting input terminal. These terminals detect a difference between reference voltage 116 and feedback voltage 106 that are applied to, respectively, first input terminal 130 and second input terminal 132. Upon amplification of the difference, an output terminal 140 of opamp 64 generates a control signal 142. Control signal 142 varies over time and has a magnitude 144 that rapidly adjusts between upper voltage 76 and lower voltage 78 for application to control terminal 110 of pass transistor 66. For example, a small change in current 70 is detected and results in an offsetting adjustment of control signal 142. Thus, in response to magnitude 144 of control signal 142, pass transistor 66 regulates amount 112 of current 70 that flows through series-connected set 68 while it also maintains negligible voltage drop 82.

Opamp 64 also includes a positive power supply input terminal 150 coupled to upper voltage 76 and a negative power supply input terminal 152 coupled to lower voltage 78. Accordingly, opamp 64 is powered by voltage difference 22 (e.g., a fully charged battery voltage) such that magnitude 144 of control signal 142 drives control terminal 110 sufficiently high that pass transistor 66 presents no appreciable voltage drop, which has been observed to be as low at 12 mV due to a small on-state resistance of pass transistor 66. In operation, negligible voltage drop 82 is largely attributable to feedback voltage 106, which is also small since opamp 64 is capable of accurately sensing slight differences (in the millivolt range) between voltages applied its inputs 130 and 132.

In some embodiments, an optional initial peak current limit resistor 160 is placed in electrical series with series-connected set 68. Initial peak current limit resistor 160 has a resistance value corresponding to a color of HP LEDs 12. For example, because some colors of HP LEDs 12 have lower forward voltages, initial peak current limit resistor 160 serves to reduce an amount of remaining voltage dropped across current regulator circuitry 80, which thereby reduces power dissipated as heat from pass transistor 66. Conversely, when HP LEDs 12 have higher forward voltages, initial peak current limit resistor 160 is a wire so as to preserve voltage difference 22 for HP LEDs 12. Initial peak current limit resistor 160 also serves to limit inrush current while opamp 64 reaches a steady state.

An optional output-control circuit 164 (labeled 164' in FIG. 4 as another embodiment) includes an output-control transistor 166 coupled output terminal 140 of opamp 64 and to control terminal 110 of pass transistor 66. Output-control transistor 166 includes an output-control terminal 170 to which is applied an output-control signal 172. Output-control signal 172 causes output-control transistor 166 to suppress control signal 142 of opamp 64 from actuating control terminal 110 of pass transistor 66. Similar to variable voltage 122 explained previously, output-control signal 172 may comprise a PWM signal. Output-control signal 172, however, dims a single string when strings of other LDO circuits are separately controllable by different corresponding output-control signals. Thus, global dimming is available through control of variable voltage 122 and per-string dimming is available through output-control signal 172 controlling output-control transistor 166.

FIGS. 3 and 4 provide two different embodiments for controlling output-control transistor 166 and thereby suppressing control signal 142. In FIG. 3, output-control transistor 166 is resistively coupled (i.e., through a resistor 174) to output terminal 140 of opamp 64 and directly coupled to control terminal 110 of pass transistor 66. Output-control signal 172, therefore, is based on inverted logic in first LDO current regulator circuitry embodiment 60. In other words, a high logic value applied to output-control terminal 170 actuates output-control transistor 166 to provide a direct path to lower voltage 78 (i.e., ground), which suppresses control signal 142 and disables HP LEDs 12. Conversely, a low logic value does not actuate output-control transistor 166 so it does not suppress control signal 142.

FIG. 4 is similar to FIG. 3, but output-control transistor 166 is arranged to couple feedback voltage 106 to opamp 64 when output-control signal 172 has a high logic level, i.e., according to non-inverted (standard) logic in second LDO current regulator circuitry embodiment 62. Thus, a high logic level actuates output-control transistor 166, in which case a resistor 176 forms a voltage divider with passive sense component 92, feedback voltage 106 is applied (via a channel through output-control transistor 166) to first input terminal 132, thereby adjusting control signal 142 for pass transistor 66 that causes HP LEDs 12 to emit light. Conversely, when output-control signal 172 is a low logic level, HP LEDs 12 are disabled because output-control transistor 166 opens its channel (opening the aforementioned voltage divider) and instead resistively couples (e.g., through resistor 176) output terminal 140 to second input terminal 132. In the absence of feedback voltage 106, output terminal 140 essential applies control signal 142 to second input terminal 132, and opamp 64 immediately drives control signal 142 sufficiently low to disable current 70 flowing through pass transistor 66. Another advantage of this embodiment 164' is that it limits inrush current because output-control signal 172 may be readily held low while opamp 64 reaches its steady state.

FIG. 5 shows an example of vehicle light head 86 including a housing 180, a PCB 182 populated by two strings 68, an optic 184, and a cover 186 that attaches to housing 180 to enclose PCB 182 and optic 184. A first string 188 includes four red HP LEDs 190. A second string 192 includes four white HP LEDs 194 that are spatially interleaved on PCB 182 with red HP LEDs 190 such that the strings share a common horizontal axis 196. This embodiment of eight LEDs (i.e., in two strings) would not have been possible previously because circuit 10 (FIG. 1) would have needed four strings of two HP LEDs or three strings of three HP LEDs. In other words, because of negligible voltage drop 82 across current regulator circuitry 80, embodiments 60 and 62 are capable of driving strings at least four HP LEDs in series-connected set 68. Accordingly, the total number of individual HP LEDs on a light head may then be subdivided into strings of fours, rather than two or three. Reducing the number of HP LED strings also provides a cost advantage through use of fewer parts, as well as lower overall current consumption by light head 86.

Figure 6:
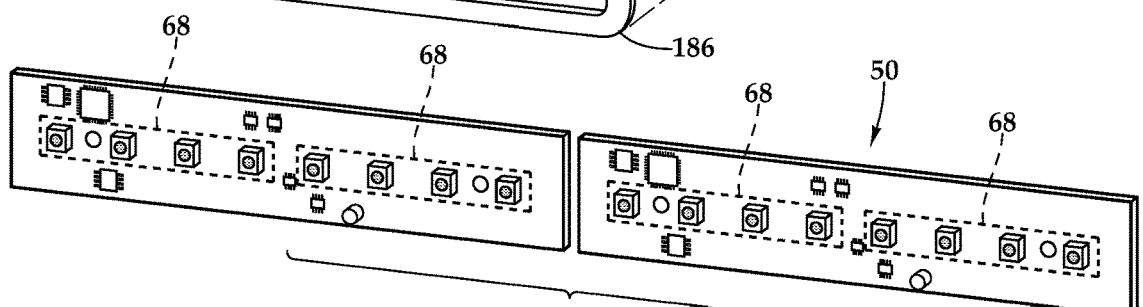
FIG. 6 is an isometric view of two of PCBs of FIG. 5 populated with color HP LEDs and arranged side-by-side to establish a high-resolution light stick, according to one embodiment.

FIG. 6 shows that side-by-side PCBs 50 may include side-by-side strings 68 of HP LEDs. This arrangement is useful for implementing high-resolution light sticks. Light sticks were previously formed from multiple light heads arranged along a common horizontal axis. An example light stick is a Safety Director™ light bar available from Electronic Controls Company of Boise, Id. Several flash patterns are available in this light bar, but all of the patterns are based on coordinated flashing of neighboring light heads. For example, in left-to-right or right-to-left patterns, a light head on one far side would flash, then its neighbor would flash, and so forth in a timed flash sequence to produce a flash pattern indicating traffic should move aside according to the visual direction indicated by the controlled sequence of flashes. Previously, however, light sticks had lower resolution because, while flash times of each light head were controllable, individual strings within each light head were operated simultaneously. FIG. 6, however, has strings 68 that operate independently based on different output control signals 172 (FIGS. 3 and 4). Thus, a light stick including side-by-side PCBs 50 has two light heads but four independently controllable stings 68 that increase the overall resolution of flash pattern producible by the light stick including side-by-side PCBs 50.

Skilled persons will appreciate that many changes may be made to the details of the above-described embodiments without departing from the underlying principles of the invention. For example, passive sense component 92 may be coupled to an anode of a member of series-connected set 68, in which case pass transistor 66 may be coupled between HP LEDs 12. Other variations are also possible. Also, other components comprising a voltage-controlled voltage source—of which a differential amplifier, FET transistor, and passive sense component(s) are parts—may be substituted by voltage-controlled current source. For example, a BJT transistor may be substituted for the aforementioned FET transistor to establish a voltage-controlled current source, which is sometimes called an opamp current source when a discrete opamp is employed as the differential amplifier. Furthermore, skilled persons will appreciate that feedback drive circuitry (e.g., a differential amplifier, also referred to as an error amplifier), a voltage-controlled voltage source, or a voltage-controlled current source may be implemented with discrete components or single IC. The scope of the present invention should, therefore, be determined only by the following claims.

The invention claimed is:

1. For a vehicle light head powered by a battery-based voltage system supplying upper and lower voltages that define a voltage difference applied across a series-connected set of high-power light-emitting diodes (HP LEDs) and current regulator circuitry electrically connected to, and facilitating light emission from, the HP LEDs of the series-connected set, a method of maximizing a number of HP LEDs in the series-connected set that are capable of emitting light, the method comprising:
   providing low-dropout (LDO) current regulator circuitry of which the current regulator circuitry, voltage reference circuitry, and feedback drive circuitry are parts;
   the current regulator circuitry including a passive sense component and a pass transistor, the pass transistor includes a first terminal coupled to receive current supplied by the battery-based voltage system, a second terminal coupled to deliver the current to the passive sense component providing a feedback voltage representing the current that passes through the series-connected set, and a control terminal by which an amount of the current is controllable;
   the voltage reference circuitry providing a reference voltage;
   the feedback drive circuitry having first and second input terminals to detect a difference between the reference and feedback voltages applied to, respectively, the first and second input terminals, and an output terminal to generate a control signal upon amplification of the difference; and
   the control signal having a magnitude that rapidly adjusts between the upper and lower voltages for application to the control terminal of the pass transistor that, in response to the magnitude of the control signal, regulates the amount of the current that flows through the series-connected set while maintaining, as the voltage difference approaches a sum of minimum forward voltages of the HP LEDs, a negligible voltage drop across the current regulator circuitry such that substantially all of the voltage difference remains available for forward biasing the HP LEDs.

2. The method of claim 1, further comprising placing in series with the HP LEDs an initial peak current limit resistor having a resistance value corresponding to a color of the HP LEDs.

3. The method of claim 1, further comprising electrically connecting the output terminal of the feedback drive circuitry directly to the control terminal of the pass transistor.

4. The method of claim 1, further comprising indirectly coupling the output terminal of the feedback drive circuitry to the control terminal of the pass transistor.

5. The method of claim 4, further comprising providing an output-control transistor connected to the output terminal of the feedback drive circuitry and the control terminal of the pass transistor, the output-control transistor having an output-control terminal to which is applied an output-control signal that causes the output-control transistor to suppress the control signal of the feedback drive circuitry from actuating the control terminal of the pass transistor.

6. The method of claim 1, further comprising directly coupling to the passive sense component an anode of a member of the series-connected set of HP LEDs.

7. The method of claim 1, in which the first input terminal of the feedback drive circuitry is a non-inverting input terminal.

8. The method of claim 1, further comprising electrically connecting the second input terminal of the feedback drive circuitry to a voltage divider establishing the reference voltage.

9. The method of claim 1, further comprising mounting each member of the series-connected set along an axis common to the other members to the set.

10. The method of claim 1, further comprising providing multiple series-connected sets of HP LEDs in the vehicle light head.

11. The method of claim 10, further comprising configuring each one of the multiple series-connected sets to dim independently of other ones of the multiple series-connected sets.

12. The method of claim 10, in which a first one of the multiple series-connected sets includes first LEDs of a first color and a second one of the multiple series-connected sets includes second LEDs of a second color.

13. The method of claim 12, in which the LEDs of the first color are spatially interleaved along an axis with those of the second color.

14. The method of claim 1, further comprising providing a variable voltage source to supply an input voltage of the voltage reference circuitry.

15. The method of claim 14, further comprising controlling dimming of the series-connected set by varying the input voltage.

16. The method of claim 14, further comprising simultaneously controlling the dimming for multiple series-connected sets by varying the input voltage.

17. The method of claim 1, further comprising:
providing the upper voltage to a positive power supply input terminal of the feedback drive circuitry; and
providing the lower voltage to a negative power supply input terminal of the feedback drive circuitry.

18. The method of claim 1, further comprising providing the pass transistor in series between two HP LEDs.

19. The method of claim 1, in which the battery-based voltage system includes a nominal 12-volt starting-lighting-ignition (SLI) battery.

20. The method of claim 1, in which the number of HP LEDs is at least four.

21. The method of claim 1, in which the negligible voltage drop comprises a variable voltage drop, the variable voltage drop configured to increase in response to an increase of the voltage difference of the upper and lower voltages.

* * * * *